Figure 3:
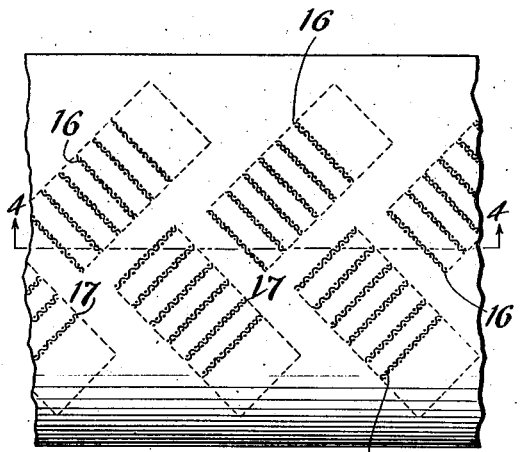

W. B. BUCKLEY.
RESILIENT VEHICLE TIRE.
APPLICATION FILED DEC. 4, 1915.

1,174,028.

Patented Feb. 29, 1916.

Inventor
Warren B. Buckley.
By Church & Church
his Attorneys

UNITED STATES PATENT OFFICE.

WARREN B. BUCKLEY, OF WASHINGTON, DISTRICT OF COLUMBIA.

RESILIENT VEHICLE-TIRE.

1,174,028. Specification of Letters Patent. Patented Feb. 29, 1916.

Application filed December 4, 1915. Serial No. 65,105.

*To all whom it may concern:*

Be it known that I, WARREN B. BUCKLEY, a citizen of the United States, residing at Washington, in the District of Columbia, have invented certain new and useful Improvements in Resilient Vehicle-Tires; and I do hereby declare the following to be a full, clear, and exact description of the same, reference being had to the accompanying drawings, forming part of this specification, and to the figures and characters of reference marked thereon.

It has heretofore been proposed in the manufacture of resilient vehicle tires to incorporate in the resilient substance itself layers or strips of fabric arranged edgewise with respect to the tread surface and extending radially from the axis on which the wheel rotates, the edges of the strips or layers of fabric lying at the tread surface of the tire and forming a portion of the wearing surface, thus materially assisting in preventing the skidding or slipping of the tire on the roadway. The beneficial effect of fabric thus incorporated in the resilient substance of the tire has been recognized and attempts have been made to procure a practical tire embodying such construction. Most of such attempts, however, have resulted in practical failure, probably owing to the fact that the resilient material of the tire is compressed on lines radial to the axis on which the wheel rotates, at the point or points where the tread surface contacts with the roadway or with obstacles and irregularities on the surface of the roadway, whereas, such compression in the previously proposed forms of tire having fabric incorporated therein as stated, must necessarily strain the fabric beyond its elastic limit at the point where it is bent in its own plane, or it must result either in buckling the fabric and thus tending to separate it from the resilient material in which it is embedded or in the pressing together of the strands and layers of the fabric followed by expansion due to the action of the resilient material in which it is embedded, any of which effects tend to cause the rapid deterioration of the fabric and the ultimate separation of its strands *seriatim* from the grasp of the resilient material in which it is incorporated.

The object of the present invention is to overcome these defects and to provide a resilient vehicle tire having layers or strips of fabric incorporated therein with intervening layers or bodies of resilient material between and extending laterally around the strips or layers of fabric, said strips or layers of fabric extending to and forming a portion of the tread surface and at the same time being so arranged and incorporated in the resilient material of the tire, that the waves of flexure or compression of the resilient material under the action of pressure on the surface of the roadway or of obstructions and irregularities of the surface of the roadway will proceed without obstruction longitudinally of the resilient body of the tread and will cause the fabric to be flexed or bent instead of being strained or compressed in the plane of the body of the fabric or the layers separated from each other or from the body of resilient material.

Broadly stated, the invention consists in incorporating in the resilient material of the tread, sections, strips or pieces of woven fabric spaced apart by intervening resilient material and occupying tangential positions or arranged at an angle to radial lines extending from the axis on which the wheel rotates. The arrangement of the fabric is such that radial compression will act thereon at an angle to the plane of the body of the fabric and consequently result in bending the fabric instead of straining or compressing the same in its own plane and at the same time the body of resilient material forming the major portion of the tread is left practically continuous so that none of its resiliency and strength is destroyed.

Figure 1:
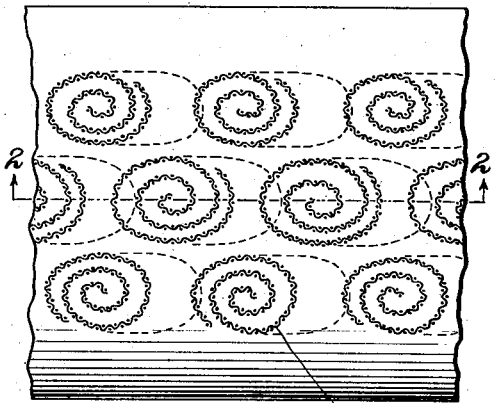
Figure 4:
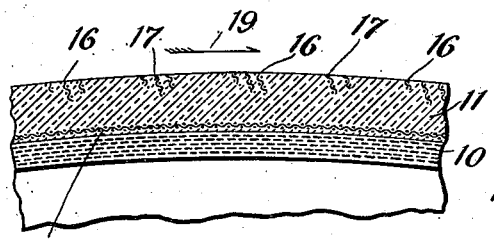
Figure 2:
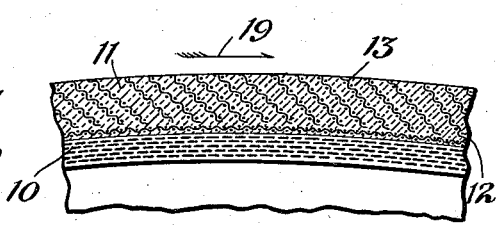
Figure 5:
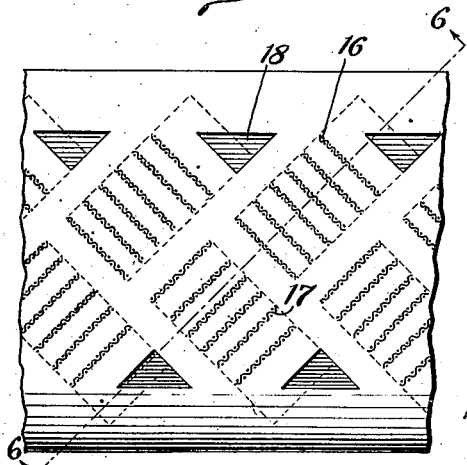
Figure 6:
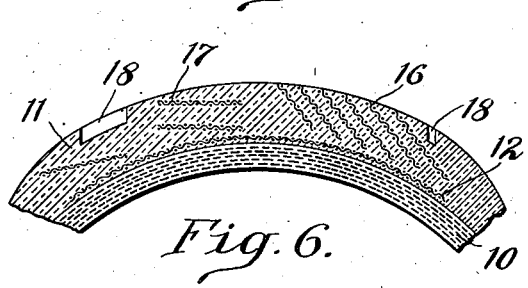
Figure 7:
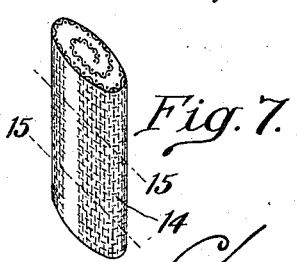

Referring to the accompanying drawings,—Figure 1 is a plan view of a short section of a vehicle tire embodying the present improvements. Fig. 2 is a sectional view in a plane indicated by the line 2—2 of Fig. 1. Fig. 3 is a view corresponding to Fig. 1, but showing a slightly modified arrangement of the layers of fabric. Fig. 4 is a sectional view on the line 4—4 of Fig. 3. Fig. 5 is a view corresponding to Figs. 1 and 3 illustrating a still further modification. Fig. 6 is a section on a diagonal plane indicated by the line 6—6 in Fig. 5. Fig. 7 is a perspective view of a roll of fabric and resilient material previous to the same being cut on diagonal planes to form the inserts illustrated in Figs. 1 and 2.

Like reference characters throughout the several figures illustrate corresponding parts.

The type of tire adopted for illustrating the present invention is the well known pneumatic tire, which embodies a series of layers of fabric 10 adapted to resist outward pressure and to maintain the form of the tire against the internal air pressure, as is customary in such structures. On the outer side of the layers of fabric 10 the tire embodies a tread portion of resilient material, customarily high grade rubber, indicated at 11, there being usually provided a breaker strip 12 extending transversely of the tread portion, but located close to the inner layers of fabric.

The body of resilient rubber 11 constitutes the wearing body of the tire and is adapted to contact with the roadway. Upon its ability to withstand wear and to form an effective anti-skid surface depends the life and success of the tire, and this is true, regardless of whether the resilient material forms the tread surface of a pneumatic tire or the outer portion of a so-called solid rubber tire, to either of which the present invention is applicable.

In accordance with the present invention there is incorporated in this resilient body of rubber forming the tread of the tire, a series of layers or sections of fabric, each separated from the other by an intervening body of resilient material, and each occupying an angular position in the resilient material, the angle being such that pressure from the tread surface inwardly, which results in compressing the resilient material, will at the same time simply bend the layer or layers of fabric out of their proper planes in accordance with the movement of the material within which the layers are embedded. In the arrangement shown in Fig. 1, the layers of fabric are arranged in the form of individual convolutes, with the convolutions spaced apart and with the axis of the convolutes at an angle to the surface of the tread, or, expressed differently, at an angle to lines radial with respect to the axis on which the wheel rotates, and which radial lines determine the direction in which pressure will be applied to the tread in the normal use of a vehicle equipped with the tire. The convolutes are indicated in Fig. 1 by the reference number 13, and in forming the same a sheet of fabric is preferably rolled up together with a layer of resilient rubber of the proper thickness and when a roll of proper size is formed, as shown at 14 in Fig. 7, it is severed into lengths appropriate to the thickness of the resilient material of the tread, in diagonal planes indicated by the dotted lines 15. The planes of severance correspond substantially to the surface of the tread and to the bases of the convolutes which are embedded deeply in the tread material and in fact preferably extend practically through the same. The convolute sections are mounted in the tread material in diagonal positions shown clearly in Fig. 2, and indicated by the dotted lines in Fig. 1, with the result that each convolute presents at the wearing surface of the tread an oval formation of greater area than the diameter of the roll from which the convolute is cut, the oval formation extending longitudinally of the tread surface. Said convolutes are placed or staged in the tread material preferably in staggered relation; that is to say, assuming that there is a central line of convolutes, the convolutions located on either side of the central line will be spaced to form the tread surface on transverse lines intermediate the center convolutes, whereby practically the major portion of the tread surface will have uniformly spaced edges of fabric appearing at its surface, each of said edges forming part of a layer which extends diagonally into the tread material in such wise that compression of the tread material will result simply in a bending or deflection of the fabric in a plane more or less transverse to the plane of the weave; or, where the convolutes are of small diameter the whole convolute may be bent or deflected with relation to its own axis by any pressure acting in lines radial to the axis of the wheel.

It is obvious that the layers of fabric which are to form by their edges part of the tread surface may be arranged in various ways and at the same time preserve their angular relation to lines radial from the axis on which the wheel turns and in Figs. 3, 4, 5 and 6, an arrangement different from that illustrated in Fig. 1 is shown. In Figs. 3 to 6, inclusive, the layers of fabric are arranged in groups, each group being inclined as stated, and the groups on opposite sides of the longitudinal center of the tire or tread being inclined at an angle with relation to each other. The inclination is preferably toward the longitudinal center of the tire, as well as at an angle to lines radial to the axis of the wheel or tread surface; thus, the layers of fabric indicated at 16, incline, as shown in dotted lines in Figs. 3 and 5 and by the full lines in Fig. 6, toward the center line of the tire and also longitudinally of that line, while the layers indicated at 17 occupy an opposite inclination with respect to the longitudinal center of the tire, by a similar inclination with respect to lines radial to the axis of the wheel or tread surface. The inclination in the same direction tangential to the periphery of the tread is shown in Fig. 4, while the inclination in opposite directions is indicated in Fig. 6, as well as by the dotted lines in Figs. 3 and 5.

In the modifications illustrated in Figs. 5 and 6, the tread surface is provided with raised and depressed portions, the depressed portions being formed by recesses 18, which recesses extend into the body of the resilient material a less distance than the layers of fabric. In fact, the layers of fabric may extend into the body of the material beneath the recesses, as shown by the dotted lines in Fig. 5, and full lines in Fig. 6, the latter view being a section on a plane which intersects two of the recesses.

In applying the tire to a vehicle wheel it is preferred that it should be so applied that the wheel will rotate in the direction indicated by the arrows 19 in Figs. 2 and 4, inasmuch as when so applied the wave of compression proceeds in a direction which will, under no circumstances, tend to do more than bend the layers of fabric in conjunction with the compression of the material in which they are embedded, and at the same time, the layers of fabric will offer the greatest possible resistance to any tendency to tear the resilient material itself, as, for example, should the wheels be spun by the motor. Furthermore, there is less tendency to cause a separation of the resilient material and the layers of fabric from each other, although this tendency is largely overcome in the present invention by forming the fabric with rather an open mesh; thus permitting of the resilient material becoming intimately incorporated therewith, throughout the entire area. Not only has the arrangement of the layers of fabric in inclined position in the resilient material all of the advantages hereinbefore pointed out, but it has the additional advantage of providing a number of fabric layers so disposed as to render it practically impossible for a puncture to occur without rupturing the fabric. This is a result which could not be obtained were the layers of fabric arranged radial or in lines coinciding with lines radial to the axis on which the wheel turns, and the result thus obtained is an advantage which of itself would indicate the desirability of the present arrangement, as compared with any of the arrangements heretofore suggested.

With the present invention the body of rubber which forms the major portion of the tread is not intersected throughout in any direction, by the layers of fabric; thus the continuity of the rubber is not interrupted and there are no planes extending entirely through the tread in any direction and composed solely of fabric, with the result that the body of rubber is an integral mass in which waves of flexure and compression may progress without setting up strains in the rubber such as would tend to rupture the bonds between the rubber and fabric layers. Inasmuch as the fabric layers are carried by or float, so to speak, in the mass of resilient material they may conform at any point to the waves of flexure or compression in the resilient material itself and without the interference of one layer of fabric with the movement of another layer of fabric. This freedom of movement with the mass of resilient material prevents any destructive disintegration or granulation of the resilient material or the rupture or destruction of the fabric itself. An additional advantage due to the use of relatively small sections of fabric is that a number of edges arranged at different angles are always in contact with the roadway and therefore a tendency to skid in any direction is opposed by edges transverse or substantially transverse to the direction in which skidding tends to occur.

What is claimed is:—

1. A vehicle tire embodying a continuous curved tread body portion of resilient material in which waves of flexure and compression may progress longitudinally of the tread surface, said tread body having incorporated therein relatively small separate layers of pliant fabric extending at one edge to the tread surface and spaced from each other both longitudinally and transversely of the tire by the resilient tread material, said layers of fabric being tangential in the plane of rotation of the tire and being free to individually and independently conform to waves of flexure and compression in the body of resilient tread material, edges exposed at the surface of the tread being arranged at different angles whereby a skid in any direction is opposed by an edge or edges substantially transverse to the direction in which skidding tends to occur.

2. A vehicle tire embodying a continuous curved tread body portion of resilient material in which waves of flexure and compression may progress longitudinally of the tread surface, said tread body having incorporated therein relatively small separate layers of pliant fabric extending at one edge to the tread surface spaced from each other and laterally surrounded by the resilient tread material, said layers of fabric being inclined at an angle to lines radial to the axis on which the tire is designed to rotate and being free to individually and independently conform to waves of flexure and compression progressing longitudinally in the tread material, edges exposed at the surface of the tread being arranged at different angles whereby a skid in any direction is opposed by an edge or edges substantially transverse to the direction in which skidding tends to occur.

3. A vehicle tire embodying a body of resilient tread material forming the wearing surface of the tire and having incorporated therein convolutes of fabric, the axis of the convolutes being at an angle to lines radiating from the axis on which the tire is designed to rotate and lying in the plane of rotation of the tire.

4. A vehicle tire embodying a body of resilient material forming the wearing surface of the tire and having incorporated therein convolutes of fabric with the convolutions spaced from each other by resilient tread material, the axis of said convolutes being inclined with respect to lines normal to the surface of the tire.

WARREN B. BUCKLEY.